United States Patent
Pleschiutschnigg et al.

[11] Patent Number: 6,149,858
[45] Date of Patent: Nov. 21, 2000

[54] APPARATUS FOR PRODUCING STEEL UTILIZING AN ELECTRICAL STEEL MAKING FURNACE VESSEL

[75] Inventors: Fritz-Peter Pleschiutschnigg, Duisburg; Wei-Ping Wu, Erkrath, both of Germany

[73] Assignee: SMS Schloemann-Siemag AG, Dusseldorf, Germany

[21] Appl. No.: 09/335,979

[22] Filed: Jun. 18, 1999

[30] Foreign Application Priority Data

Jun. 19, 1998 [DE] Germany .............................. 198 27 299

[51] Int. Cl.[7] .................................. C21B 7/24; C21C 5/32
[52] U.S. Cl. .................................. 266/99; 266/225; 373/73
[58] Field of Search .............................. 373/73; 266/99, 266/144, 225, 218; 75/10.38, 10.42, 10.61, 10.66

[56] References Cited

U.S. PATENT DOCUMENTS

| | | | |
|---|---|---|---|
| 3,353,807 | 11/1967 | Sixel et al. | 116/72 |
| 3,876,418 | 4/1975 | Baum | 75/10.38 |
| 4,447,265 | 5/1984 | Schwer | 75/306 |
| 4,531,971 | 7/1985 | Sugiura et al. | 75/10.38 |
| 4,701,216 | 10/1987 | Spenceley et al. | 75/10.42 |
| 5,393,037 | 2/1995 | Ehle et al. | 266/144 |
| 5,454,852 | 10/1995 | Pirklbauer et al. | 75/10.42 |

FOREIGN PATENT DOCUMENTS

| | | |
|---|---|---|
| 0 630 977 A1 | 12/1994 | European Pat. Off. . |
| 10 00 412 | 1/1957 | Germany . |
| 44 34 369 | 3/1995 | Germany . |
| 44 34 369 | 3/1996 | Germany . |
| 195 26 704 | 5/1997 | Germany . |
| 195 26 704 C 1 | 5/1997 | Germany . |

Primary Examiner—Roy V. King
Assistant Examiner—Tima McGuthry-Banks
Attorney, Agent, or Firm—Herbert Dubno

[57] ABSTRACT

A method of and an apparatus for the production of steel utilizing a single vessel for the electric arc smelting of scrap, directly reduced iron or pig iron in solid form, and for the oxygen blowing of the resulting melt through an oxygen lance introduced via a tower-shaped part of the roof. Another part of the roof can pivot to allow charging of the furnace with solids and the tower can be provided with a funnel enabling a molten iron charge to be fed to the furnace.

8 Claims, 2 Drawing Sheets

APPARATUS FOR PRODUCING STEEL UTILIZING AN ELECTRICAL STEEL MAKING FURNACE VESSEL

FIELD OF THE INVENTION

The present invention relates to an apparatus and a process for making steel in a steel making furnace having a furnace roof as well as at least one electrode connected in a direct current or alternating current configuration and utilizing at least one oxygen lance.

BACKGROUND OF THE INVENTION

Increasing use has been made in recent years of electrical steel making principles to produce steel from scrap and such scrap replacements as directly reduced iron and molten crude iron. The conventional furnace for this purpose uses either an electric arc, for example, as a scrap smelting medium or is formed as a converter operating with about 80% molten crude iron.

A known process from DE 44 34 369 A1 alternates oxygen blowing and electric arc melting in two neighboring furnace vessels. A drawback of this system is the long cycling time and the consequent high energy loss and the high degree of iron oxide formation. The long cycling time is a consequence of the time required for replacement of the oxygen blowing lance by the electrodes for the electric arc smelting and vice versa. Further drawbacks reside in the unsatisfactory oxygen blowing and the high degree of spraying of the melt onto the furnace roof.

DE 195 26 704 C1 describes a process in which electrode smelting and oxygen blowing is carried out alternately in a single furnace vessel with the drawback that the electrode stroke is considerable and leads to long cycling times.

Another disadvantage of conventional electronic arc smelting processes is that dioxin may be liberated in the gases which are discharged and to pyrolytically decompose the dioxin, an additional burner may be required.

OBJECTS OF THE INVENTION

It is, therefore, the principal object of the present invention to provide an improved apparatus which allows both electric arc smelting and oxygen blowing to be carried out in an optimum manner and so that the cycling time is shortened and the heat losses and energy consumption is reduced and the slag foaming improved during the electric arc smelting of the scrap.

It is another object of the invention to provide an improved method of making steel whereby drawbacks of the methods mentioned earlier are obviated.

Yet another object of the invention to provide an improved method of operating a steel making furnace which optimizes the electric arc smelting of scrap and the oxygen blowing of an iron melt.

SUMMARY OF THE INVENTION

These objects and others which will become apparent hereinafter are attained, in accordance with the invention, by carrying out electric arc smelting of scrap and oxygen blowing of an iron melt in parallel, i.e. at least in part simultaneously in the single vessel.

According to a feature of the invention, an electrical steel making furnace according to the invention can comprise:

a furnace vessel adapted to receive a charge of iron refinable to produce steel;

a roof for the furnace formed with a swingable part and a tower-shaped stationary part;

at least one electrode extending into the vessel for direct-current or alternating-current melting of scrap therein; and at least one oxygen lance extending into the vessel for oxygen refining of iron to steel therein.

The method of making steel according to the invention can comprise:

(a) introducing an iron melt and steel scrap into an electrical furnace vessel; and (b) electric-arc melting the scrap while at least in part simultaneously oxygen blowing the melt through a lance to refine iron into steel.

The invention also includes a method of operating a steel making furnace which comprises the steps of:

(a) charging an electrical steel-making furnace, comprising:

a furnace vessel adapted to receive a charge of iron refinable to produce steel, a roof for the furnace formed with a swingable part and a tower-shaped stationary part, at least one electrode extending into the vessel for direct-current or alternating-current melting of scrap therein, and at least one oxygen lance extending into the vessel for oxygen refining of iron to steel therein, with steel scrap through the swingable part while evacuating evolved gases through the tower-shaped stationary part;

(b) smelting the steel scrap in the vessel by direct current or alternating current arc melting using an electrode introduced into the vessel through the swingable part;

(c) charging a melt of iron into the vessel during the smelting and oxygen blowing the melt at least in part simultaneously with the smelting of the steel scrap with an oxygen lance extending into the vessel through the tower-shaped stationary part;

(d) continuously feeding carbon and lime to the vessel through the tower-shaped stationary part and producing below the tower-shaped stationary part a foam slag while scrap is electric-arc smelted below the swingable part; and (e) tapping steel from the vessel.

According to the invention, therefore, the vessel has a roof with a first swingable part which can rotate to open or close the vessel and a second stationary part which is tower-shaped.

The roof closes the vessel which can receive at the first part the scrap which can be charged into the vessel through the opening provided when the swingable part is swung into its open position.

The roof covers the vessel which receives the melt and a slag layer covering the melt. The first swingable and preferably flat part of the cover or roof is provided for charging of scrap, hot briquetted iron (HBI) and crude iron in solid form into the vessel. In the middle of this first swingable part means can be provided for guiding an electrode for electric arc smelting and the electrode can be operated in a direct current or alternating current configuration.

The furnace of the invention, like conventional electric arc furnaces, can have a slag discharge door and a tapping hole for tapping of the melt from the furnace.

The region under the second stationary part of the roof is free from scrap. Molten crude iron can be fed into the furnace in this region. As a consequence, the apparatus of the invention permits simultaneously the electric arc smelting of scrap and the oxygen blowing of the crude iron melt for refining of the latter. In other words both procedures take place in parallel and concurrently.

A further advantage of the invention is that the oxygen blowing can be effected without the danger of spraying of the melt or slag onto the roof. This is the case because the region in which oxygen blowing is effected, namely, in the second section below the tower, is free from scrap and the oxygen blowing can thus begin simultaneously with the electric arc smelting or even before the beginning of the electric arc smelting.

Finally, with respect to the apparatus, it nay be noted that the configuration described facilitates the slag formation which covers the bath. The slag layer, indeed, is formed even before the electric arc smelting is completed in the oxygen blowing region. The early formation of the foam slag avoids the otherwise required reduction in the transformer power after electric arc smelting and reduces the power-on time with respect to conventional electric arc systems. In conventional electric arc systems, the electric arc must remain in a power of state after the end of scrap smelting for 1 to 2 minutes until the foam slag forms.

The apparatus of the invention has a high flexibility and can be used for systems ranging up to 100% scrap, up to 100% directing reducing iron and up to 80% molten crude iron.

The operator can select the composition of the charge and the proportions of the scrap, directly reduced iron and molten iron depending upon environmental and economical conditions. Because of the oxygen blowing and the fact that the furnace is optimally designed for the oxygen blowing the decarbonization may be carried significantly below the 0.03% in turn is lower than the 0.05% to 0.10% residual carbon of conventional systems. The strong CO reaction with oxygen blowing also improves the nitrogen removal.

A funnel can be provided on the tower-shaped stationary part and can receive a cover hinged thereto and through which a crude iron melt can be charged into the furnace. The crude iron can be supplied by a ladle to the funnel through a tundish or trough. Since the crude iron is charged into a slag free part of the furnace vessel beneath the tower-shaped part of the cover, this operation is independent of the arc smelting and therefore does not require a power-off time. The stationary tower shaped part of the roof is preferably also provided to guide the oxygen lance. Natural gas and air can be supplied together with the oxygen via the oxygen lance or separately therefrom, i.e. the gases can be supplied through separate lances.

The gases evolved in the furnace vessel can be withdrawn by a suction device disposed above the tower-shaped part of the roof during the charging of the scrap into the furnace vessel through the open swingable part of the roof. This drastically reduces possible release of evolved gases into the atmosphere. The evacuation of waste gases through the tower shaped part of the cover simultaneously allows dioxins to be burned off when they are produced during the electric arc smelting of the scrap.

The dioxin containing waste gas is heated to the point that it is pyrolytically decomposed or combusted in the tower-shaped part of the roof.

The heating of the dioxin containing waste gas by means of burners placed externally of the furnace is thus no longer required.

Via a measurement and control system, as a function of the waste gas analysis, the space of the lance from the surface of the bath and the blowing rate can be controlled and the gas composition regulated for optimum decarbonization, foam slag formation and after burning of gases.

Temperature measurements and sampling as well as bath surface measurements can be effected by at least one sublance inserted into the vessel through the tower-shaped part.

When the furnace is provided with at least one burner or a side lance, the latter can be provided for spraying chemical energy and for accelerating the electric arc smelting. The foam slag formation, coal can be introduced along the oxygen through the slide lances.

In still another feature of the invention, below the second or tower-shaped part of the roof, especially at a lower vessel, flushing stones (perforated stone blades) and/or blowing-bath nozzles can be provided for blowing oxygen or gas mixtures or gas solid mixtures into the melt. Lime and coal as well as gases such as especially oxygen, natural gas, argon and nitrogen can be blown into the melt.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
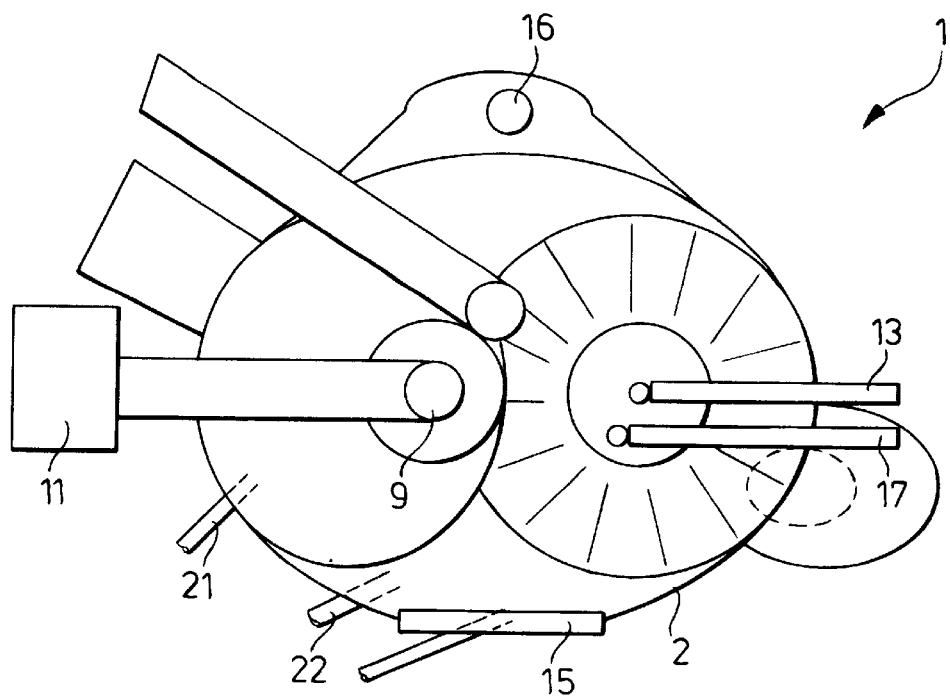
FIG. 1 is a plan view of a steel making furnace according to the invention.
Figure 2:
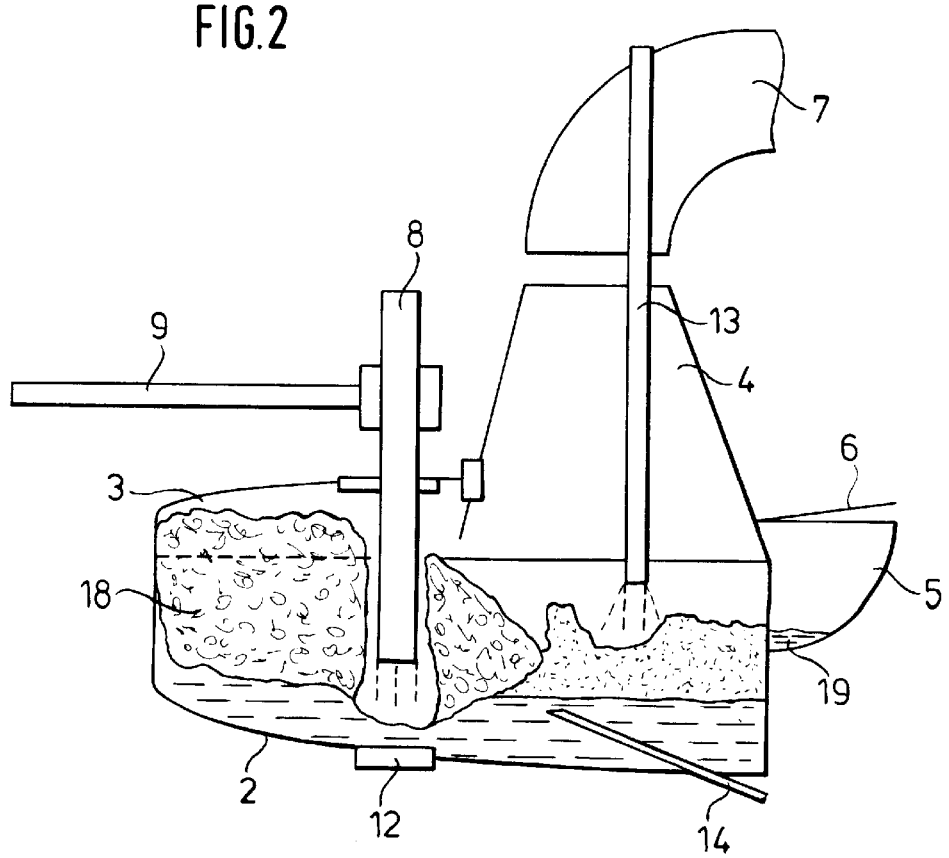
FIG. 2 is a diagrammatic side elevational view, partly broken away, of the apparatus of FIG. 1.

The furnace 1 shown in FIGS. 1 and 2 is comprised of a furnace vessel 2 with a two-part roof. The vessel can be lined with any standard furnace refractory. The two-part roof comprises a first or swingable part 3 and a tower-shaped or standard stationary part 4. The tower-shaped part 4, which has the configuration of a cone converging upwardly, has a funnel 5 mounted thereon and provided with a flap-type cover 6 hinged on the tower-shaped part 4. Through the funnel a melt 19 can be added to the furnace vessel.

Above the tower-shaped part 4 of a cover a suction device 7 is provided for drawing off the gases evolved in the furnace.

The roof of the furnace 2 is thus subdivided into two parts, namely, a first part formed at the left side in the drawing and in which an electric arc can be formed for the electronic arc smelting of scrap. The right hand side of the furnace, surmounted by the tower-shaped portion 2, is provided with the funnel 5 as noted.

For electronic arc smelting, the swingable cover 3 has a guide for an electrode 8 which is, in turn, mounted on an arm 9. A transformer 11 and an appropriate rectifier, can supply the electrode 9 with direct current. The counter-electrode is the floor electrode 12.

The tower-shaped roof part 4 receives an oxygen lance 13 which serves for refining the iron melt.

The furnace vessel 2 has nozzles 14 opening blow the level of the bath into the melt and a slag door 15, as well as a tapping hole 16. Apart from the oxygen lance 13 which, as shown in FIG. 1, extends through the tower shaped part 4, there is provided a sublance 17 which can reach into the vessel to measure the temperature or take a sample of the melt.

In operation, the swingable roof part 3 can be swung open about a vertical axis and scrap 18 charged into the furnace vessel 2. Simultaneously suction is applied at 7 to draw off evolved gases during scrap charging.

Slightly later, the flap cover 6 is opened and via the funnel 5 molten pig iron is charged into the furnace. The molten iron refining is effected via the oxygen lance 13 which extends into the vessel through the tower shaped roof part 4 and simultaneously the electric arc smelting of the scrap 18 is promoted by heat from the burner 21.

By means of the swingable covered part 3 a practically continuous feed of directly reduced iron and lime can be provided. In addition, coal and lime can be supplied at the start of the process to promote foam slag production. Through the side lances 22 additional oxygen and gases as well as coal dust can be blown into the melt to promote slag formation.

Via the sublance 17 indicated in FIG. 1, temperature measurements and samples can be taken of the melt. If overheating occurs, the slag door 15 can be opened and slag discharged while molten steel can be tapped from the hole 16.

Figure 3:
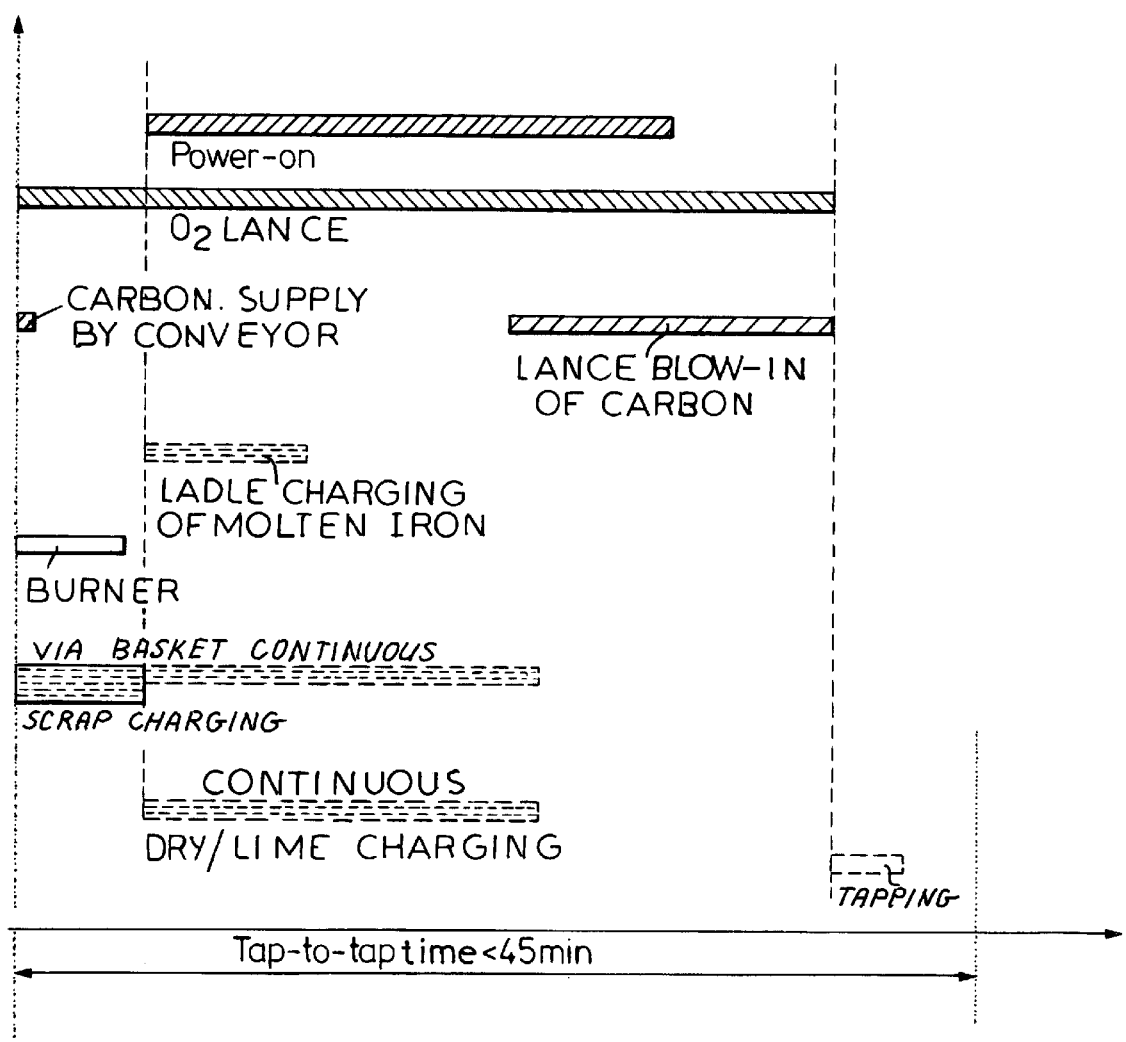
FIG. 3 is a timing diagram for various steps in the operation of the apparatus of FIGS. 1 and 2.

The timing of the various steps has been shown in FIG. 3 and after tapping of the molten steel, the apparatus is ready for reuse for the next charge.

The invention provides a combination of an electric arc and converter in a common furnace and, to this end, the tower part 4 of the roof can conically converge upwardly like the mouth of a converter.

We claim:

1. An electrical steel-making furnace, comprising:
   a furnace vessel adapted to receive a charge of iron refinable to produce steel;
   a roof for said furnace formed with a swingable part and a tower-shaped stationary part;
   at least one electrode extending into said vessel for direct-current or alternating-current melting of scrap therein;
   at least one oxygen lance extending into said vessel for oxygen refining of iron to steel therein; and
   an upwardly open funnel formed on said tower-shaped stationary part for feeding molten iron into said vessel, and a cover for said funnel hinged onto said tower-shaped stationary part, said oxygen lance extending into said vessel through said tower-shaped stationary part.

2. The steel-making furnace defined in claim 1, further comprising suction means above said tower-shaped stationary part for evacuating evolved gases from said vessel.

3. The steel-making furnace defined in claim 2, further comprising a sublance extending into said vessel through said tower-shaped stationary part for taking temperature measurements or for sampling.

4. The steel-making furnace defined in claim 3, further comprising at least one burner and at least one side lance opening into said vessel.

5. The steel-making furnace defined in claim 4, further comprising at least one flushing stone or at least nozzle opening into said vessel below a bath level therein for introducing oxygen, a gas mixture of a solids/gas mixture into the melt below said tower-shaped stationary part.

6. An electrical steel-making furnace, comprising:
   a furnace vessel adapted to receive a charge of iron refinable to produce steel;
   a roof for said furnace formed with a swingable part and a tower-shaped stationary part;
   at least one electrode extending into said vessel for direct-current or alternating-current melting of scrap therein; and
   at least one oxygen lance extending into said vessel for oxygen refining of iron to steel therein; said oxygen lance extending into said vessel through said tower-shaped stationary part.

7. An electrical steel-making furnace, comprising:
   a furnace vessel adapted to receive a charge of iron refinable to produce steel;
   a roof for said furnace formed with a swingable part and a tower-shaped stationary part;
   at least one electrode extending into said vessel for direct-current or alternating-current melting of scrap therein;
   at least one oxygen lance extending into said vessel for oxygen refining of iron to steel therein; and
   a sublance extending into said vessel through said tower-shaped stationary part for taking temperature measurements or for sampling.

8. An electrical steel-making furnace, comprising:
   a furnace vessel adapted to receive a charge of iron refinable to produce steel;
   a roof for said furnace formed with a swingable part and a tower-shaped stationary part;
   at least one electrode extending into said vessel for direct-current or alternating-current melting of scrap therein;
   at least one oxygen lance extending into said vessel for oxygen refining of iron to steel therein; and
   at least one burner and at least one side lance opening into said vessel.

* * * * *